INVENTORS
Walter G. Humphreys, deceased
by Lowell K. Humphreys and
Chelsea B. Humphreys, heirs
BY

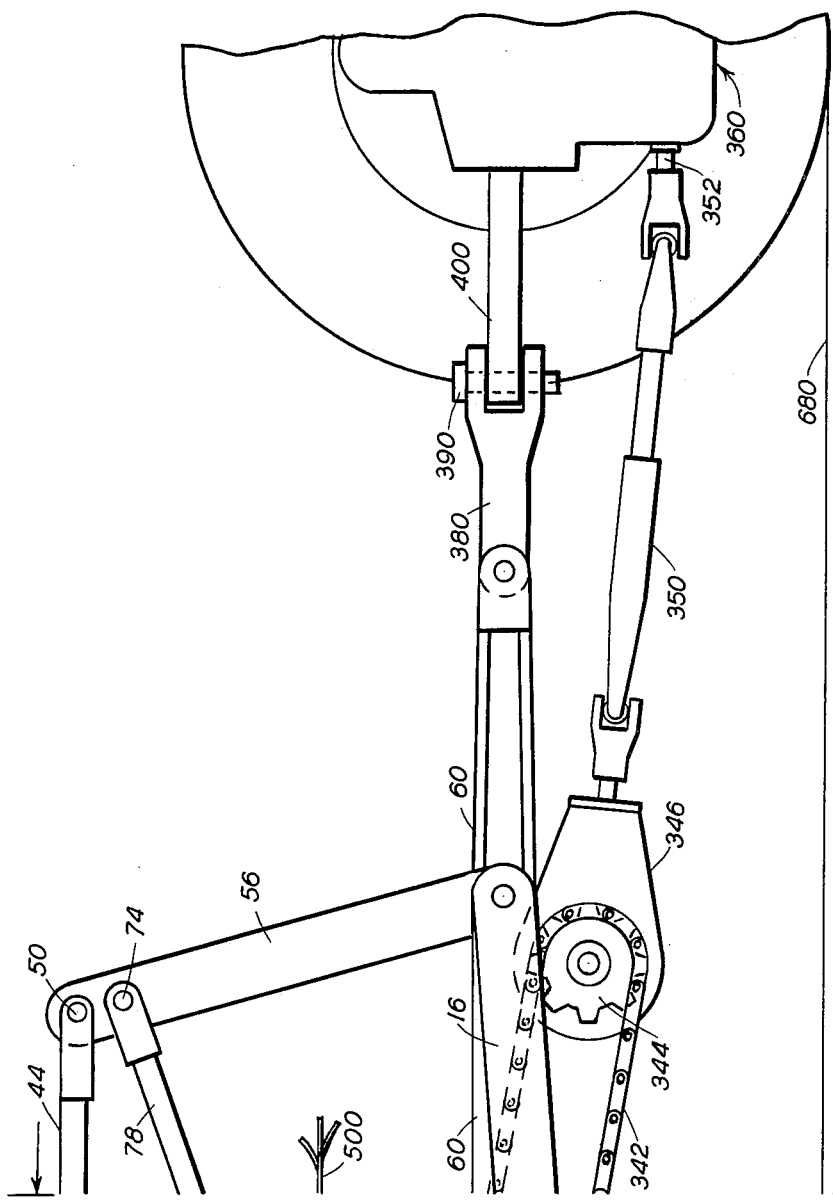

Jan. 18, 1966 W. G. HUMPHREYS 3,229,773
HOOK TOOTHED DEEP TILLER WITH ROTARY CLEANER
Filed June 15, 1964 4 Sheets-Sheet 3

INVENTOR
Walter G Humphreys, deceased
by Lowell K. Humphreys and
Chelsea B. Humphrey, heirs
BY Hiram A. Sturges,
Agent

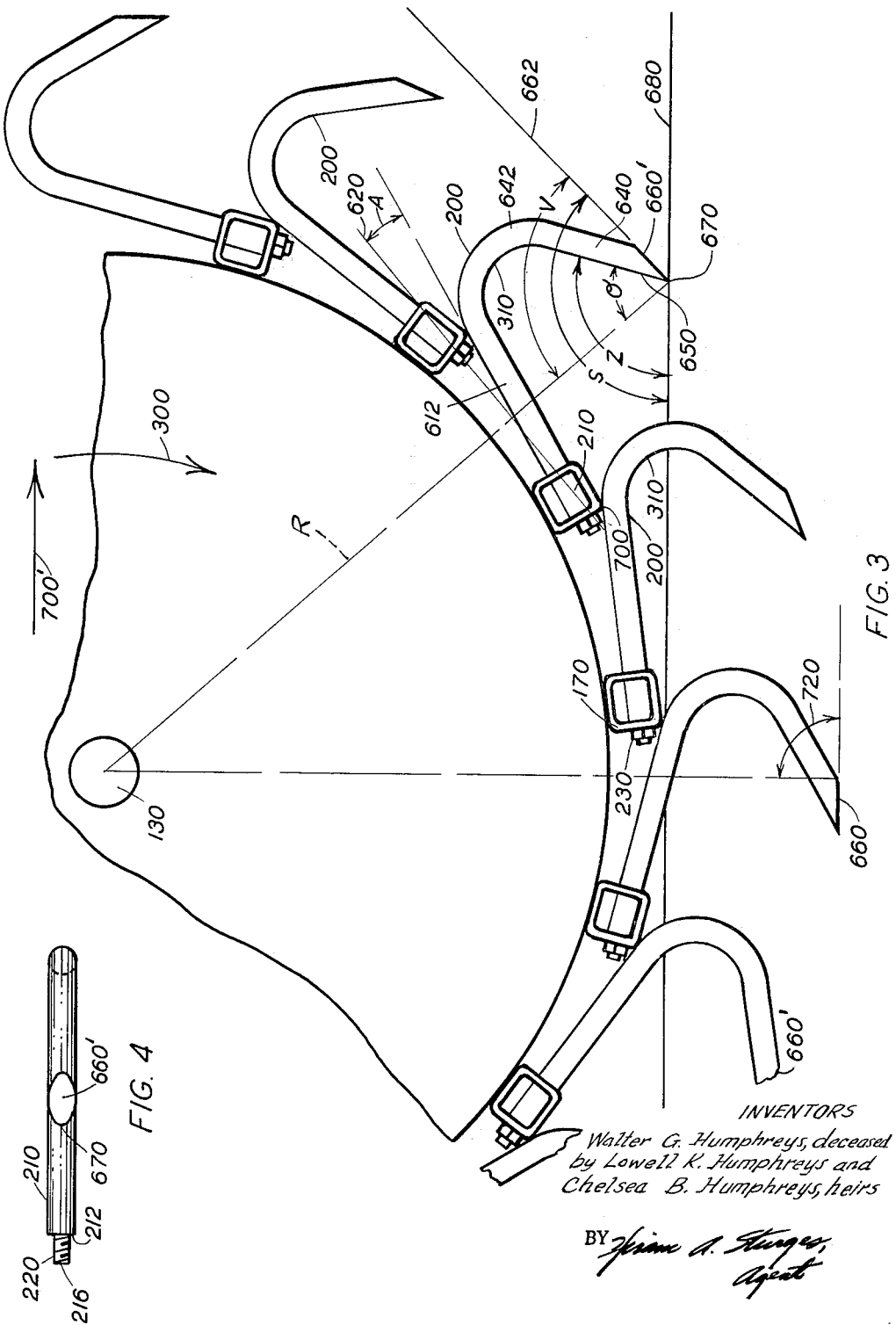

United States Patent Office 3,229,773
Patented Jan. 18, 1966

3,229,773
HOOK TOOTHED DEEP TILLER WITH ROTARY CLEANER
Walter G. Humphreys, deceased, late of Harlingen, Tex., by Lowell K. Humphreys, 4746 Roanoke Parkway, Kansas City, Mo., and Chelsea B. Humphreys, 102 E. Arroyo Drive, Harlingen, Tex., heirs
Filed June 15, 1964, Ser. No. 377,172
7 Claims. (Cl. 172—39)

This invention relates to a hook toothed deep tiller with rotary cleaner, which is power rotated to the rearward on the under side to assist forward movement of the machine and operation with a minimum power consumption.

A particular object is to provide a deep tiller having new hook-shaped teeth especially adapted for deep tillage with a minimum requirement of tractor power.

Deep tillage has long been recognized as very desirable to bring up nutrients in any farm area and is also recognized in the Southwest as an answer to root rot plague.

However, conventional plows designed for deep plowing have had a primary disadvantage in that the power required to pull them through the ground has been so great that the cost of the large track-type tractor (rather than the usual wheel-type tractor) necessary has been often approximately three times the cost of much smaller tractors, which I have discovered by experiment, are sufficient to pull the deep tiller of this invention.

The reason for this much greater efficiency is, I believe, attributable to the shape of the hook-shaped teeth of my invention, the fact that they rotate rearwardly on the under side of the rotor and thereby assist forward movement of the tractor, and in greater particular, the way the teeth enter the ground and the direction of the motion of the teeth as they do so.

Even though a conventional plow and large tractor of the track-type have a far greater cost, nevertheless, I have discovered that the deep tiller of this invention puts out much smaller dirt clods, breaking up the clods, whereas the conventional plow equipment turns up big clods which must later be worked down by a separate operation with additional labor cost.

A particular object of this invention is to provide deep tillage possibilities for the farmer who cannot afford a track-type tractor large enough to deep till with a conventional deep tillage plow.

Still another object of this invention is to provide the farmer that can afford a track-type tractor with a deep tiller which he can substitute for a conventional deep tillage plow which will break up the ground much more satisfactorily and which will operate at higher speeds because of the greater efficiency.

It is my opinion that the way my hook-shaped teeth enter the ground, move through the ground, and come up out of the ground, exercises a sort of leverage or prying action on the ground causing an efficiency of operation superior to that of a common plow share.

A further object of this invention is to provide a deep tiller that is the answer to Johnson grass of the Southwest which is tough like dry straw and entangles non-rotary cultivators, and which must be deep tilled.

A further object of this invention is to provide a deep tiller that can cultivate as deep as 14 inches as I have found by experiment and as is particularly valuable in sugar cane country.

A particular object is to provide a deep tiller which is adapted to operating effectively in hard ground which it breaks up into fine pieces.

Still another object is to provide a deep tillage machine which will pull evenly and smoothly, partly because the teeth of the machine are staggered, and do not strike the ground in sizable rows.

Still another object is to provide a deep tiller which I have found by experiment will operate smoothly without chatter or vibration to any substantial degree.

A further object is to provide a deep tiller, the rotary portion of which is hinged on a wheel supported frame in a fashion such that it can be lowered and raised to travel at various depths of digging positions by control means preferably hydraulic.

A further object is to provide a deep tiller, the rotor of which is driven from both ends rather than from one end and for a minimum twisting of the rotor.

Yet a further object is to provide a rotor, the teeth of which are mounted on bars which latter are themselves mounted on spaced discs of the rotor whereby the teeth can be removed from the bars and replaced with teeth of another nature for other purposes if desired.

A salient objective of the invention is to provide teeth for a deep tiller which have an ideal angular relationship between the surface of the rearward end of each tooth at the outer end thereof, and the radius of the rotor, this ideal relationship representing an acute angle for attaining an ideal balance between minimum use of power throughout the entire operation of the tooth during its entrance travel through the ground and reentry into the air.

Another salient objective of the invention is to provide a cleaning device for a deep tiller which is adapted to flail at the hook-shaped teeth with a rotary motion for knocking trash and weeds therefrom. The cleaner rotates at high speed and most effectively.

Still another objective lies in the provision of hooks having inner sections inclining outwardly only slightly with respect to a tangent to the rotor with an outer end of an inner section engaging a portion of the rotor at a certain point, the portion of the rotor so engaged preferably being a bar extending parallel to the axis of the rotor and fixed to discs of the rotor, whereby such a bar engages and supports the hook in an area spaced a considerable distance from the anchored innermost end of the respective hook, whereby the anchoring of the innermost end takes care of tension forces and the supporting at the certain point tends to absorb twisting forces that might otherwise cause breakage at the anchoring point.

An important objective is to provide not just a specialized tilling machine for use in Johnson grass or especially where deep tilling is needed, but also a machine which can be used in place of a plow under any circumstances—a machine useful not only in specialized uses but a machine that is also extremely versatile.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawing:

FIGURE 1B is a side elevation similar to 1A, but of the forward portion of the deep tiller of this invention shown connected to a rearward end portion of a tractor.

FIGURE 3 is a side elevational detail showing the rotor in enlarged form, a portion of the rotor only being shown in a position for engaging the ground.

FIGURE 4 is a bottom plan view of a hooked tooth of the rotor of FIGURE 3 as it would be seen at times when the tooth is in the position of the lowermost tooth of FIGURE 3.

Figure 1A:
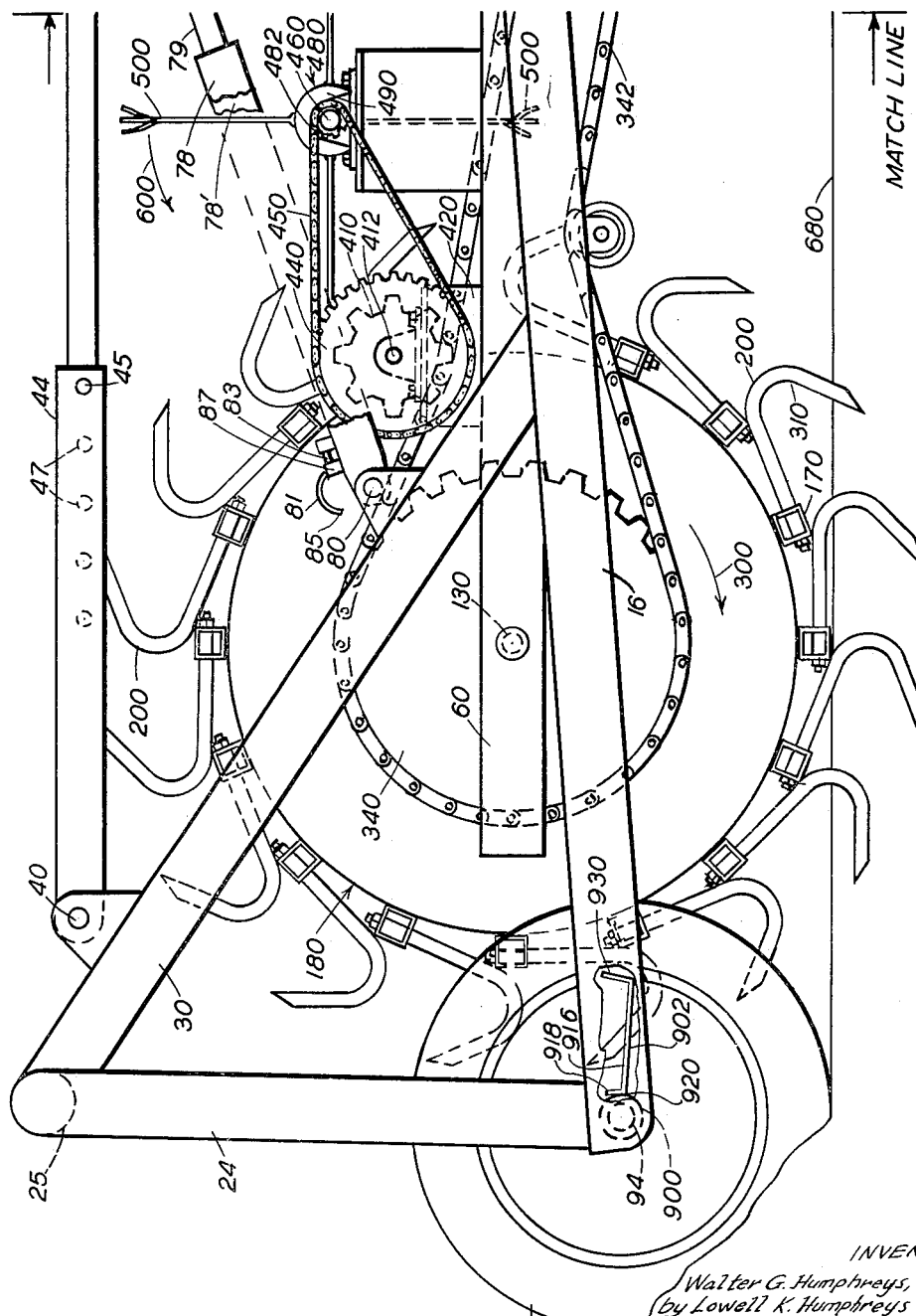
FIGURE 1A is a side elevation of the rearward portion of the deep tiller of this invention shown in ground-engaging tilling position.
Figure 2:
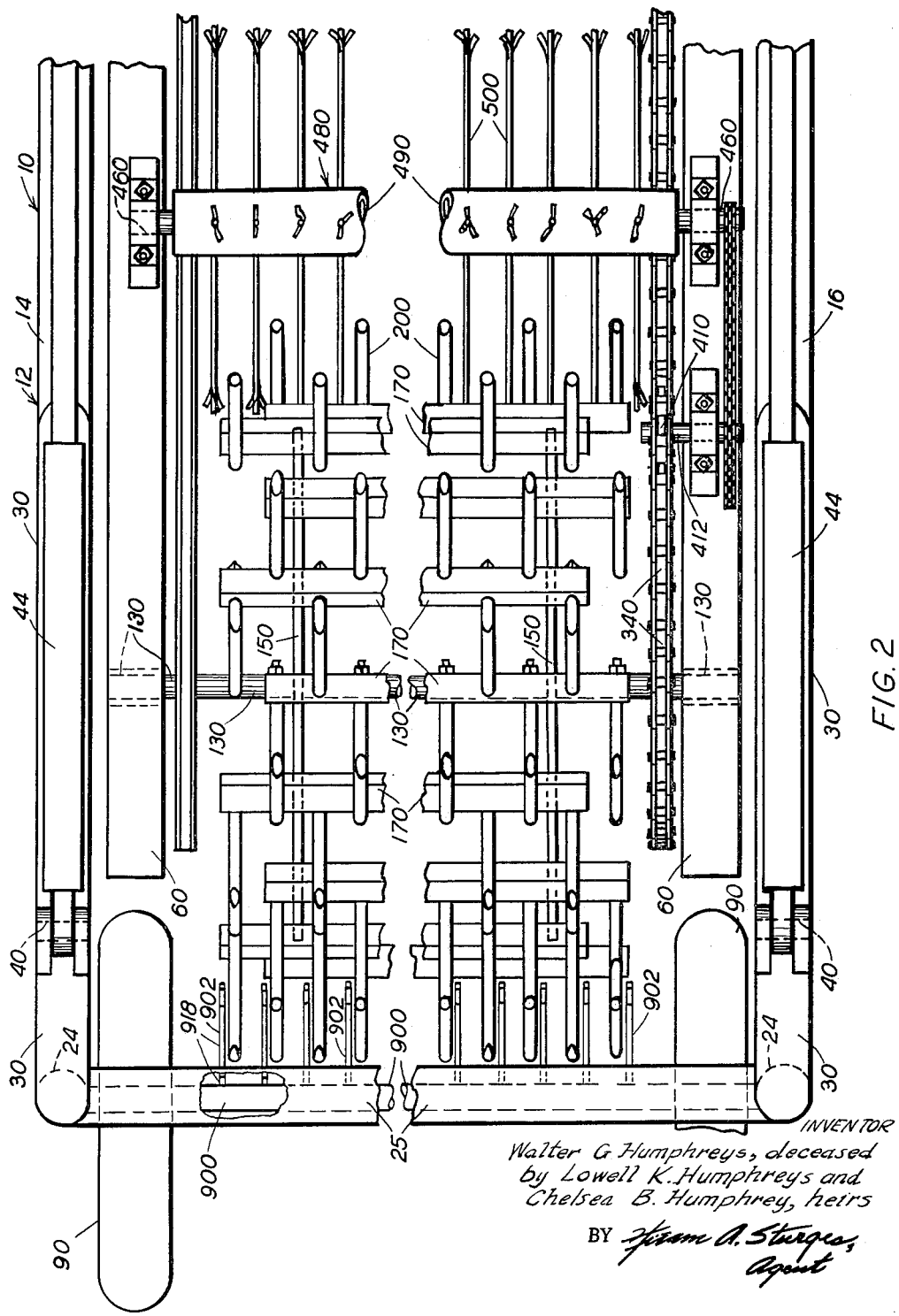
FIGURE 2 is a top plan view of the rearward end portion of this invention, the view extending only somewhat farther forward along the machine from the view of FIGURE 1A.

Referring to the accompanying drawing and particularly to FIGURE 2, it will be seen that the hook toothed deep tiller of this invention is generally indicated at 10 and has an outer frame 12 having longitudinal side members 14 and 16 which latter, as best seen in FIGURE 1A, have upright members 24 attached to their rearward ends held in place by braces 30, which latter are rigidly attached to the side frame members 14 and have their upper ends pivotally connected at 40 to an adjustable linkage assembly 44, which latter extends horizontally forward, each assembly 44 having its forward end pivotally connected by a pin 50 to one of two uprights 56, which latter each have a lower end rigidly connected to a right and a left hand inner frame member 60 and 62 respectively, the upper end of the upright 56 being attached at a pivot 74 to an adjustable linkage means 78 which extends rearwardly and downwardly therefrom to a pivotal connection assembly 80, which latter is attached to the upper side of a lower portion of the respective brace 30.

Accordingly, by adjusting the adjustable length assemblies 44 and 78, wheels 90 at the rearward end of the deep tiller and mounted between the side frame members 14 on axle means 94, shown in dotted lines in FIGURE 1A, can be raised and lowered with respect to right and left inner frame members 60 and 62, which is of a very useful purpose since the inner frame members 60 and 62 comprising parts of an inner frame which can be generally designated by the numeral 120, the inner frame 120 carrying a rotor axle 130 transversely thereacross between the inner frame members 60 and 62, the rotor axle carrying thereon a plurality of spaced discs, the discs being designated at 150, and the exact number of discs being immaterial to the principles of this invention.

The discs 150 carry thereon a plurality of tooth-mounting bars 170, which latter extend transversely of the discs 150 and in alignment with the axle 130 of the rotor, the discs 150 being circular in shape and being disposed with their peripheries lying in planes extending normal to the rotor axis 130.

Around the rotor, which I shall designate with the general numeral 180, there are a plurality of teeth 200, which latter are secured to the mounting bars 170 by means of having the bars 170 provided at spaced places with opening means extending transversely therethrough normal to the rotor axis 130, such opening means being suitable to receive the inner ends 210 of each hooked tooth therein, as best seen in FIGURE 3. As best seen in FIGURE 4, inner ends 210 are each provided with a shoulder 212 disposed inwardly of the innermost end 216 thereof, the shoulder 212 being adapted to abut that side of the respective bar 170 which is disposed forwardly when a tooth is in a downward position, as seen in FIGURE 3.

Between the end 216 and the shoulder 212 is a threaded portion 220 receiving a nut 230 disposed on the rearward side of the bar 170 for tightly holding each bar 170 between the respective shoulder 212 and nut 230.

Referring to FIGURE 1A, the rotor is driven so as to rotate clockwise as shown in the direction of an arrow 300, whereby the rotor moves rearwardly on its underside so that concave rearward sides 310 of the hooks 200 face the ground as they move rearwardly.

The discs 150 are drivably attached to the axle 130, which latter is fixed to a gear 340 on which a sprocket chain 342 is placed, the chain 342, as best seen in FIGURE 1B, being disposed around a drive sprocket 344 on a gear box 346 connected by suitable telescoping drive assembly means 350 to the power takeoff shaft 352 of a towing tractor 360 to which the inner frame members 60 are connected by means of a tongue assembly 380 fixed by a pin 390 to the drawbar 400 of the tractor 360.

The sprocket 342 is also engaged by a sprocket 410 on an axle 412 mounted in a bearing assembly 420 fixed to the inner frame members 60 on each side thereof, there being two chains 342, two gears 340, one at each end of the axle 130, two sprockets 410, and two gears 440 fixed to the sprockets 410, each gear 440 having a small sprocket chain 450 thereon suitably drivably connected to the drive shaft 460 of a cleaner assembly generally indicated at 480, the drive shaft 460 having a gear 482 attached to it on which the chain 450 is placed, there being two gears 482, one at each end of the shaft 460.

On the cleaner shaft 460 a cleaner hub 490 is mounted which extends transversely of the machine, and out from the cleaner hub 490 many cables or elongated flexible metallic cleaning members 500 are provided, the latter being spaced apart along the hub 490 and being fixed thereto by suitably extending into hub 490 and being prevented by means, not shown, from moving outwardly thereof, whereby outer ends of each cleaner member 500 extend outwardly equal distances to other cleaner members 500 from the hub 490, the cleaner assembly 480 being so disposed transversely in front of the rotor assembly 180 that the flexible cleaners 500 tend to lap the path of travel of the hooks 310 sufficiently that outer ends of the cables or cleaners 500 tend to extend inwardly almost to the respective bar 170 of any tooth that is in a position passing through a plane extending between the axles 130 and 460 of the rotor and cleaner assemblies respectively. As the cleaner members 500 are made of cables, it will be seen that they tend to unravel, whereby each cable or cleaner 500 has a plurality of outer ends and very effective cleaning is accomplished by the rotation of the cleaning assembly 480 downwardly at its rearward side or in a counterclockwise direction as shown in FIGURE 1A and in the direction of the arrow 600 shown in that view.

It will be seen that the cleaning members, being cables, are flexible along substantially their entire length giving effective cleaning action, inexpensively.

Referring now to FIGURE 3, it will be seen that each hook 200 has a very special shape having an innermost end portion 612 which is straight and which is disposed inclining at an angle of about 10 degrees with respect to a tangent line 620, tangent to the rotor assembly 180 and at a right angle to its radius line R, as best seen in FIGURE 3, the angle of 10 degrees being indicated at A.

An outer portion of each hook is indicated at 640 and is interconnected with the inner portion 612 by an arcuate portion 642, the shape being such that the outer portion 640 of each hook is preferably straight, whereby it has a rearward 650, which latter is disposed at an angle of approximately 55 degrees with respect to the radius line R, the angle of 55 degrees being indicated in FIGURE 3 at O.

The forward side of each hook member 200 is provided at its outermost portion 660 with a flat surface 660', which latter is preferably disposed in a plane normal to the radius line R, the said plane being indicated by a line 662 in FIGURE 3, the plane 662 being disposed in parallelism with the rotor axle 130 and the plane 662 and the surface 660' extending through a point 670 at the outermost end of the hook where the surface 660' intersects the rearward side 650 of the outermost portion 640 of the respective hook.

As best seen in FIGURE 3, each hook will travel through the surface of the ground 680 making first an entry and then as the rotor continues to rotate in the direction of the arrows 300 while general motion of the machine is forward in the direction of the arrow 700' in FIGURE 3, the hooks will tend to move through the ground, each assuming in succession the position of one of the hooks shown in FIGURE 3 until a hook has entered, dug a deep furrow, cracked, broken, and loosened the ground thoroughly, and then re-entered into the air with the undersurface of the outermost portion of the hook being disposed at an upwardly inclined position for inclining upwardly during the time when a hook has passed its bottom-most point, that is, the bottom-most point of the outermost part of the respective hook, namely, the outermost surface 660 so that the surface 660 tends to incline upwardly thereafter, as best seen in FIGURE 3, with further forward motion and rotation.

It will be seen that each adjustable linkage means 78 is preferably a hydraulic cylinder assembly 78 with a piston rod 79 with a hydraulic line 81 connected thereto by a fitting 87, the line 81 having a forwardly extending portion 85 which can be connected to a suitable manually operated valve-controlled hydraulic fluid-under-pressure supply, not shown, on the tractor where the driver can reach and operate it from the driver's seat.

A branch 83 of the line 81 also goes to another hydraulic cylinder 78', as there are two cylinders 78 and 78' each on a different side of the machine, each connected similarly to a respective brace 30 and a respective upright 56, as there are two duplicate uprights 56, one on each side of the machine, also.

The line 81 has its portion 85 extending forwardly, as is not shown, from a connection fitting 87 to the branch 83 to the tractor.

The r.p.m. of the power takeoff of a tractor is 540 when the tractor is moving ahead at 1.2 miles per hour in low gear. Very successful operation was experienced when the power takeoff shaft of such a tractor goes through a 1-ton International truck rear end of a 1950 model.

The diameter of the rotor from axis to the supporting bars 170, in models successfully tested, is thirty-six inches.

It will be seen that the teeth are arranged in rows which are extending in parallelism with the rotor axis, each tooth of one row being staggered with respect to adjacent teeth of an adjacent row.

The cleaner assembly 480 preferably rotates approximately eighteen times for each revolution of the digging rotor, preferably making approximately three cables hitting against or striking close to a single tooth as the tooth passes by the cleaning assembly. It will be seen that the cleaning assembly pushes weeds off of the tooth from its hooked end to its anchored end, which is just the opposite from the way the weeds get on a tooth during digging.

In operation, the machine will be found to dig far deeper than any rotary tiller with which the inventor hereof has ever known of. Tilling need be done, by going through the field with this machine, only once, not six or seven times. Travel should be slow, on dry ground rather than mud, and in low tractor gear. It will be found that very small gear tractors have sufficient power to pull the machine.

Effective operation through the very difficult Johnson grass will be experienced with the cleaning attachment cleaning the teeth to retain their effective operation.

The surface 660' of each hook can also be called a downwardly facing surface 660' and each surface 660' is so disposed that it inclines upwardly at its rearward end with respect to its forward end during at least the majority of, and preferably at least 80% of, the period of time when the hook is between its bottom-most point directly under the rotor axis and time when the hook again re-enters the air. This period of time can be called the "climb-out" period. During this climb-out period the upward inclination of the rearward end of the surface of the downwardly facing surface 660' will cause the tooth to tend to climb out of the ground under rotation force making the power that need be applied lesser for a given amount of digging results.

Successful operation was achieved by pulling the tiller with a one-ton 1959 Ford Diesel Tractor of the smallest type made in 1959 and with one trip through the ground was ready to be replanted.

Contrary to anything earlier said herein the teeth 310 are square in cross section except for their sharpened ends along side the surface 660' and also except for their threaded ends 220. In FIGURE 4, a tooth modification is shown which is round in cross section, but this is not preferred. It is preferred instead that each bar 170 have a recess which is on the forward side thereof at a time when a respective attached hook is in a ground engaging position (as shown in FIGURE 3), the said recess being square in cross section along a substantial part of its length in order to snugly receive the square cross section tooth to prevent a tooth from twisting, whereby the hooked shaped outer edge of each tooth is engaged in a plane normal to the rotor axle 130.

Each bar 170 further has what can be called a rearward recess, which latter is preferably of a size for snugly receiving the threaded portion 220 of the tooth, whereby a bar shoulder surface is defined between the walls of the forward and rearward recesses against which the toothed shoulder 212 engages.

As each bar is preferably hollow the forward recess above described is defined by a square opening through the forward side of the bar and also by the hollow center portion of the bar and the rearward side of the bar has an opening therethrough of a size for snugly receiving the threaded portion 220 of the tooth, whereby the rear opening defines the rear recess of the bar and the rear opening can be a cylindrical bore.

A successful deep tiller of my invention had 16 of the bars 170, each 56" long and of 2" width and 2" depth and on each bar were mounted 10 hooked teeth spaced transversely of the machine. These 16 bars were attached to the remainder of the rotor so that their inner sides were arranged in a cylindrical configuration 36" in diameter. It was a machine having a rotor as above described which was used in the tests mentioned herein. The discovery that the hooked shaped teeth would pull through the earth and with less effort than any other shape was proven after experiments with all kinds of cutting edges. The teeth are narrow and pointed and for this reason sometimes I preferred to call them "points" rather than teeth. Each tooth is square in cross section except for its pointed end and its threaded portion and can thus be economically made from square bar material. For this reason the teeth can be made ¾" square or 1" square with good effect and thus it can be seen that they are relatively thin.

The long hooked shape positions the working point far enough in advance of the arcuate portion 310 of a tooth so that the earth has a chance to pulverize adjacent the point whereby the earth separates before the arcuate or supporting part 310 comes to an earth section which has been pulverized. With this construction the portion 310 of the tooth that would tend to "bat" at the ground is "batting" at pulverized ground previously broken up and pulverized by the penetrating or tipped portion of the tooth whereby less power is needed to move the "batting" portion 310 through the ground. A maximum "batting" effect is to be expected along that part of the curved portion 310 which is in alignment with the radius of the rotor as will further illustrate what is meant by the "batting" portion.

The ground will be found to be broken by the penetrating points with almost explosive force. The harder the material or the drier the ground the more crumbling or explosive the effect seems to be. The earth has a chance to bust out of the way before the supporting or "batting" portion of the tooth comes to it, because the supporting portion or batting portion of the tooth is far enough back to be out of the way of the action caused by the point.

In this regard we have found it effective to have the distance from the point to the beginning of the arcuate portion 310 to be 4".

Referring now to FIGURE 1a and 2 it will be seen that a plurality of cleaner bars are shown at 902, each disposed in a plane extending longitudinally of the machine parallel to the line of travel. Each bar 902 has a center portion 916 extending substantially horizontally but inclined downwardly somewhat at its forward end and further has a rearward end upwardly extending for facilitating its attachment by means of welding 920 to a normal rotating axle housing 900, as best seen in FIGURE 1a, whereby each bar 902 is supported rigidly and strongly.

Each bar 902 has an upwardly and forwardly extending section 930, from the forward end of its center portion 916. The forward portion 930 is almost at a right angle with the central portion 916 but does incline forwardly of a normal position with respect to the portion 916 at a substantial acute angle with respect to the normal described, whereby in operation the cleanr bars 902 tend to knock mud and weeds from the teeth and facilitate their cleaning, the latter is a job the remaining part of which is done by the cable cleaner assembly 480 earlier described.

From the foregoing description, it is thought to be obvious that a hook toothed deep tiller with rotary cleaner constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. In a hook toothed deep tiller: a frame, a rotor means mounting said rotor on said frame for rotation about a transverse horizontal axis, means mounted on said frame for connecting said rotor to a source of power in a manner for driving said rotor in a direction such that its undersurface moves rearwardly during forward travel of the deep tiller, a plurality of teeth each lying in a plane disposed normal to the axis of said rotor, said teeth being disposed around the periphery of said rotor, each of said teeth being hook-shaped and each having a portion disposed closest to said axis defining an inner portion of said tooth, each tooth having a portion disposed farthest from said axis defining an outer portion of the respective tooth and each tooth having an intermediate portion interconnecting said inner and outer end portions of the respective tooth, at times when each tooth is disposed directly beneath the rotor axis, its inner portion extends forwardly its outer portion extends rearwardly and its intermediate portion is disposed forwardly of its outer and inner portions, the outer portion of each tooth being disposed generally at an acute angle with respect to the inner portion of the respective tooth, each tooth when in ground entry position having its outermost portion provided with a rearward surface disposed at an acute angle with respect to a radius of said rotor extending through the outermost end of the respective tooth, said rotor having a plurality of spaced bars attached thereto and disposed around its circumference and extending transversely of said deep tiller, a certain one of said teeth having its innermost end anchored to one of said bars, said one tooth having an inner portion extending forwardly from its anchored end at times when said tooth is disposed in a lowermost position directly beneath said rotor axis, said inner portion of said tooth having its rotor-axis side in engagement with a supporting one of said bars, said supporting bar being a bar disposed forwardly of the bar which anchors said certain tooth at times when said tooth is in said lowermost position, whereby said supporting bar tends to give the tooth support at a point spaced a substantial distance from its anchored end to prevent the forward end of said tooth from moving toward the rotor-axis under pressure of the ground against outer parts of said tooth and for causing stress at said anchored end of said tooth to be substantially all linearly of that portion of said tooth which is closest to the rotor axis.

2. The combination of claim 1 in which said supporting bar serves also as an anchoring bar for a tooth adjacent said certain tooth.

3. The combination of claim 1 in which said certain tooth is removably anchored to its anchor bar by the following construction: said innermost end of said tooth having a tip end portion of lesser cross sectional size for providing a shoulder on said tooth adjacent said end portion, said bar having an opening therethrough having a first portion of a size for receiving the larger part of the innermost portion of said certain tooth, said opening having a second portion of a size smaller than the largest part of the innermost portion of said certain tooth, whereby said bar is provided with a shoulder for engaging said tooth shoulder, said tip end portion of said certain tooth extending through said second and smaller portion of said anchoring bar opening, and means on the smaller terminal end of said tooth and attached thereto for preventing said smaller end of said tooth from moving through said smaller portion of said anchoring bar opening in a direction generally toward the remainder of said certain tooth.

4. In a hook toothed deep tiller: a frame, a rotor means mounting said rotor on said frame for rotation about a transverse horizontal axis, means mounted on said frame for connecting said rotor to a source of power in a manner for driving said rotor in a direction such that its undersurface moves rearwardly during forward travel of the deep tiller, a plurality of teeth each lying in a plane disposed normal to the axis of said rotor, said teeth being disposed around the periphery of said rotor, each of said teeth being hook-shaped and each having a portion disposed closest to said axis defining an inner portion of said tooth, each tooth having a portion disposed farthest from said axis defining an outer portion of the respective tooth and each tooth having an intermediate portion interconnecting said inner and outer end portions of the respective tooth, at times when each tooth is disposed directly beneath the rotor axis, its inner portion extends forwardly, its outer portion extends rearwardly and its intermediate portion is disposed forwardly of its outer and inner portions, the outer portion of each tooth being disposed generally at an acute angle with respect to the inner portion of the respective tooth, each tooth when in ground entry position having its outermost portion provided with a rearward surface disposed at an acute angle with respect to a radius of said rotor extending through the outermost end of the respective tooth, said rotor having a plurality of spaced bars attached thereto and disposed around its circumference and extending transversely of said deep tiller, a certain one of said teeth having its innermost end anchored to one of said bars, said one tooth having an inner portion extending forwardly from its anchored end at times when said tooth is disposed in a lowermost position directly beneath said rotor axis, said certain tooth being removably anchored to its anchor bar by the following construction: said innermost end of said tooth having a tip end portion of lesser cross sectional size for providing a shoulder on said tooth adjacent said end portion, said bar having an opening therethrough having a first portion of a size for receiving the larger part of the innermost portion of said certain tooth, said opening having a second portion of a size smaller than the largest part of the innermost portion of said certain tooth, whereby said bar is provided with a shoulder for engaging said tooth shoulder, said tip end portion of said certain tooth extending through said second and smaller portion of said anchoring bar opening, and means on the smaller terminal end of said tooth and attached thereto for preventing said smaller end of said tooth from moving through said smaller portion of said anchoring bar opening in a direction generally toward the remainder of said certain tooth.

5. The combination of claim 4 in which said tip end portion is threaded and in which said means disposed thereon is a nut with ready removability of a tooth.

6. The combination of claim 4 in which said tiller is further provided with a cleaning assembly, said cleaning assembly having a rotating hub rotatably mounted on said tiller, said hub extending transversely of said tiller, means for driving said rotating hub whereby the direction of rotation of said hub is downwardly on its rearward side, and a plurality of flexible cleaning members attached to said hub and extending radially outwardly therefrom during operation, said cleaning members lapping the path of said teeth as said teeth pass adjacent said cleaning assembly, said cleaning members being flexible along substantially their entire length, whereby the whipping of said flexible members against material caught on said teeth will tend to clean said material from said teeth during operation.

7. The combination of claim 4 in which said tiller is further provided with a cleaning assembly, said cleaning assembly having a rotating hub rotatably mounted on said tiller, said hub extending transversely of said tiller, means for driving said rotating hub whereby the direction of rotation of said hub is downwardly on its rearward side, and a plurality of flexible cleaning members attached to said hub and extending radially outwardly therefrom during operation, said cleaning members lapping the path of said teeth as said teeth pass adjacent said cleaning assembly, said cleaning members being flexible along substantially their entire length, whereby the whipping of said flexible members against material caught on said teeth will tend to clean said material from said teeth during operation, said cleaning members being formed of cable.

References Cited by the Examiner
UNITED STATES PATENTS

| | | | |
|---|---|---|---|
| 1,778,334 | 10/1930 | Pedersen | 172—119 X |
| 2,007,646 | 7/1935 | Gilbertson | 172—121 X |
| 2,162,434 | 6/1939 | Hillyer | 172—45 |
| 2,366,571 | 1/1945 | Riddle | 172—123 |
| 2,595,537 | 5/1952 | Pitcher | 172—39 X |
| 2,787,943 | 4/1957 | Browning | 172—45 |

FOREIGN PATENTS

| | | |
|---|---|---|
| 949 | 12/1852 | Great Britain. |
| 278,416 | 10/1927 | Great Britain. |

References Cited by the Applicant
UNITED STATES PATENTS

| | | |
|---|---|---|
| 226,921 | 4/1880 | McCray. |
| 1,138,720 | 5/1915 | Albracht et al. |
| 1,613,997 | 1/1927 | Hanson. |

ABRAHAM G. STONE, *Primary Examiner.*

FRANCIS B. HENRY, *Assistant Examiner.*